United States Patent [19]

Eremity et al.

[11] Patent Number: 4,602,662

[45] Date of Patent: Jul. 29, 1986

[54] VALVE FOR LIQUID MARKING SYSTEMS

[75] Inventors: Frank Eremity, Hanover Park; George Arway, Norridge, both of Ill.

[73] Assignee: Videojet Systems International, Inc., Elk Grove Village, Ill.

[21] Appl. No.: 783,262

[22] Filed: Oct. 3, 1985

Related U.S. Application Data

[63] Continuation of Ser. No. 540,532, Oct. 11, 1983, abandoned.

[51] Int. Cl.⁴ ............................................ G01D 5/18

[52] U.S. Cl. .................................. 141/198; 137/414; 346/140 R; 346/75; 141/98; 141/301

[58] Field of Search ................ 346/75, 140 R, 140 IJ; 141/1, 94, 95, 98, 192, 198, 227, 228, 301, 302, 308, 309, 39, 40; 137/413–414

[56] References Cited

U.S. PATENT DOCUMENTS

| | | | |
|---|---|---|---|
| 2,735,442 | 2/1956 | Kenney | 137/414 X |
| 2,854,994 | 10/1958 | Glascow | 137/414 |
| 3,385,316 | 5/1968 | Couffer, Jr. | 137/414 |
| 3,761,953 | 9/1973 | Helgeson et al. | 346/75 |
| 3,805,822 | 4/1974 | Joannon | 137/414 X |
| 3,811,464 | 5/1974 | Esten | 137/414 |
| 3,930,258 | 12/1975 | Dick et al. | 346/75 |
| 3,961,337 | 5/1976 | Jung et al. | 346/140 IJ |
| 4,023,182 | 5/1977 | Arway et al. | 346/75 |
| 4,067,020 | 1/1978 | Arway | 346/75 |
| 4,121,222 | 10/1978 | Diebold et al. | 346/75 |
| 4,143,126 | 12/1978 | Chocholaty et al. | 346/75 |
| 4,234,885 | 11/1980 | Arway | 346/140 IJ |
| 4,300,552 | 11/1981 | Cannon | 138/45 |
| 4,366,943 | 1/1983 | Licary | 251/30 |
| 4,399,446 | 8/1983 | McCann et al. | 346/140 IJ |
| 4,403,227 | 9/1983 | Bertschy et al. | 346/75 |

FOREIGN PATENT DOCUMENTS

| | | |
|---|---|---|
| 1166670 | 10/1969 | United Kingdom . |
| 1518629 | 7/1978 | United Kingdom . |
| 2062179 | 5/1981 | United Kingdom . |
| 2105495 | 3/1983 | United Kingdom . |

OTHER PUBLICATIONS

Bivco Catalog, "Multi-Valves".

Circle Seal Controls Catalog, "Ultra Sensitive Check Valves".

Humphrey Catalog, "Vacuum Valves".

*Primary Examiner*—Stephen Marcus

*Assistant Examiner*—Ernest G. Cusick

*Attorney, Agent, or Firm*—McDougall, Hersh & Scott

[57] ABSTRACT

A valve is disclosed suitable for use in ink marking systems. The valve has an output port, a supply port, and a control port. The control port communicates with a chamber disposed above a flexible diaphragm while the output port communicates with a reservoir to be periodically supplied with fluid. The diaphragm flexes between an open position permitting the supply port to communicate with the output port and a closed position blocking such communication as a function of the pressure differential across the diaphragm created by pressure changes at the central port.

15 Claims, 2 Drawing Figures

VALVE FOR LIQUID MARKING SYSTEMS

This application is a continuation of application Ser. No. 540,532, filed Oct. 11, 1983, now abandoned.

BACKGROUND OF THE INVENTION

This invention relates to specialized valves and valve systems for use in fluid systems. More specifically, it relates to liquid marking systems wherein ink is applied in droplets or as a stream of material to various surfaces for marking purposes. Such systems are often referred to as drop on demand or ink jet marking or printing systems. In one example of such systems, ink is pressurized and forced through a nozzle to create tiny drops which may be controlled electrostatically or otherwise to determine where and when they will strike the article to be marked. In another example a drop is created on demand and directed toward the article to be marked.

For brevity throughout the specification such systems, regardless of type, will be referred to as liquid or ink marking systems. Such equipment is used for many applications including, but not limited to, industrial marking applications as, for example, date coding on food and beverage packing lines, addressing magazine labels, and the like.

The ink used in ink jet marking equipment possesses a particular range of properties, among which are included viscosity, conductivity, density, etc., which must be maintained within specified limits to insure proper operation. Because the ink may be recycled many times from the nozzle back to the ink supply, over a period of time, this could be a reason for change of physical characteristics to occur. One of the primary causes of this change is the evaporation of the solvent portion of the ink. Thus, as the ink is sprayed from the nozzle and the unused portion thereof returned by the catcher to the ink supply, solvent evaporates to the atmosphere adversely affecting the ink's properties. It is necessary to provide means to replace this solvent loss to obtain reduced equipment maintenance and extended service from the ink supply.

Automatic solvent re-supply systems are known in the art. Generally they consist of a detector associated with the ink supply reservoir which signals when solvent should be added and a means for transporting the solvent from a container to the ink supply reservoir. The detector portion of these systems, forming no part of the present invention, can be of various types. Some detectors weigh the ink supply and add solvent when a certain weight loss is detected. Others measure the volume or the specific gravity of the ink. The present invention, which is a valve suitable for controlling the flow of any fluid including solvent may be used with any suitable detector as detailed hereafter.

As indicated, the invention is suitable for use in connection with solvent transport in a liquid marking system. It can, however, be utilized in many other applications with equal success. For example, the valving system of the invention can also be used to gate the flow of ink in a system, such as disclosed in U.S. Pat. No. 4,121,222 assigned to the present assignee. Indeed, the valve can be used in any application where it is desired to transfer a liquid from one location to another.

A current method for transporting liquids in ink jet marking systems involves the use of a small, electrically energized pump for the purpose of liquid transport. That system requires a separate component and the attendant expense and utilization of additional space. Apart from the added initial costs, there may be more maintenance costs. Another example for transporting liquid from one location to another in a marking system involves use of an air operated valve. Such a system is disclosed in U.S. Pat. No. 3,930,258. Such valves, while operating satisfactorily, can be improved with respect to reliability, system compatibility, size and, in particular, cost. Such components are relatively large and quite expensive.

The present invention seeks to overcome the disadvantages of existing liquid transport valves and permit the design of a controlled liquid flow system which uses more simply operable and lower cost valves. More specifically, the present invention permits valving of solvent using means which are small and low cost and which permit a manufacturer of marking fluids, such as solvent and inks, to insure the integrity of the chemicals used.

CROSS REFERENCE TO RELATED APPLICATION

This application is related to application Ser. No. 524,658 filed Aug. 19, 1983, entitled "Ink Valve for Marking Systems" assigned to the present assignee.

SUMMARY OF THE INVENTION

The valve system of the present invention does not require its own energy source (electrical, pneumatic, etc.). Rather it utilizes either existing system vacuum or easily provided vacuum. For example, in one ink jet marking system such a vacuum is normally employed for recovering unused ink from the print head. In that particular system the vacuum serves two functions, namely, to control operation of a liquid supply valve and to transport the liquid from one location to another when the valve is activated. This use of the existing or "system" vacuum allows for the design of a very simple, low cost valve. The valve does not need to be strong enough to resist the strain of pneumatic control as does a conventional valve. Similarly, the present invention is simpler and safer than electrically operated valves which are unsuited to the purpose of handling volatile solvents.

The invention consists of a three port valve including a supply port, an output port and a control port. Disposed within a valve chamber communicating with the ports is a flexible diaphragm, the position of which controls fluid flow therethrough. The diaphragm is positioned by operation of a separate 3-way valve communicating with the control port which, in the exemplary embodiment, is operated by the detector means associated with the ink supply reservoir. When sealed the valve has its control port vented to atmosphere while its output port is in communication with the system vacuum thereby insuring a tight seal. In the open position the control port is connected to the system vacuum and, because the valve chamber includes a large surface area above the diaphragm, sufficient force is developed to open the valve permitting flow of liquid.

It is accordingly an object of the invention to provide a fluid valve and valve system which are simple, small and low in cost.

It is a further object of the invention to provide a valve and valve system for liquid marking systems which can be operated using existing system vacuum or easily provided vacuum and do not require an additional controlled energy source (pneumatic or electrical) for operation.

A further object of the invention is to provide a system of the type described which can be miniaturized and incorporated in the closure member of a liquid container used in a compact liquid supply system.

Another object of the invention is to provide a low cost, efficient three port valve for use in liquid flow systems.

Other objects and advantages of the invention will be apparent from the remaining portion of the specification.

DETAILED DESCRIPTION

Figure 1:
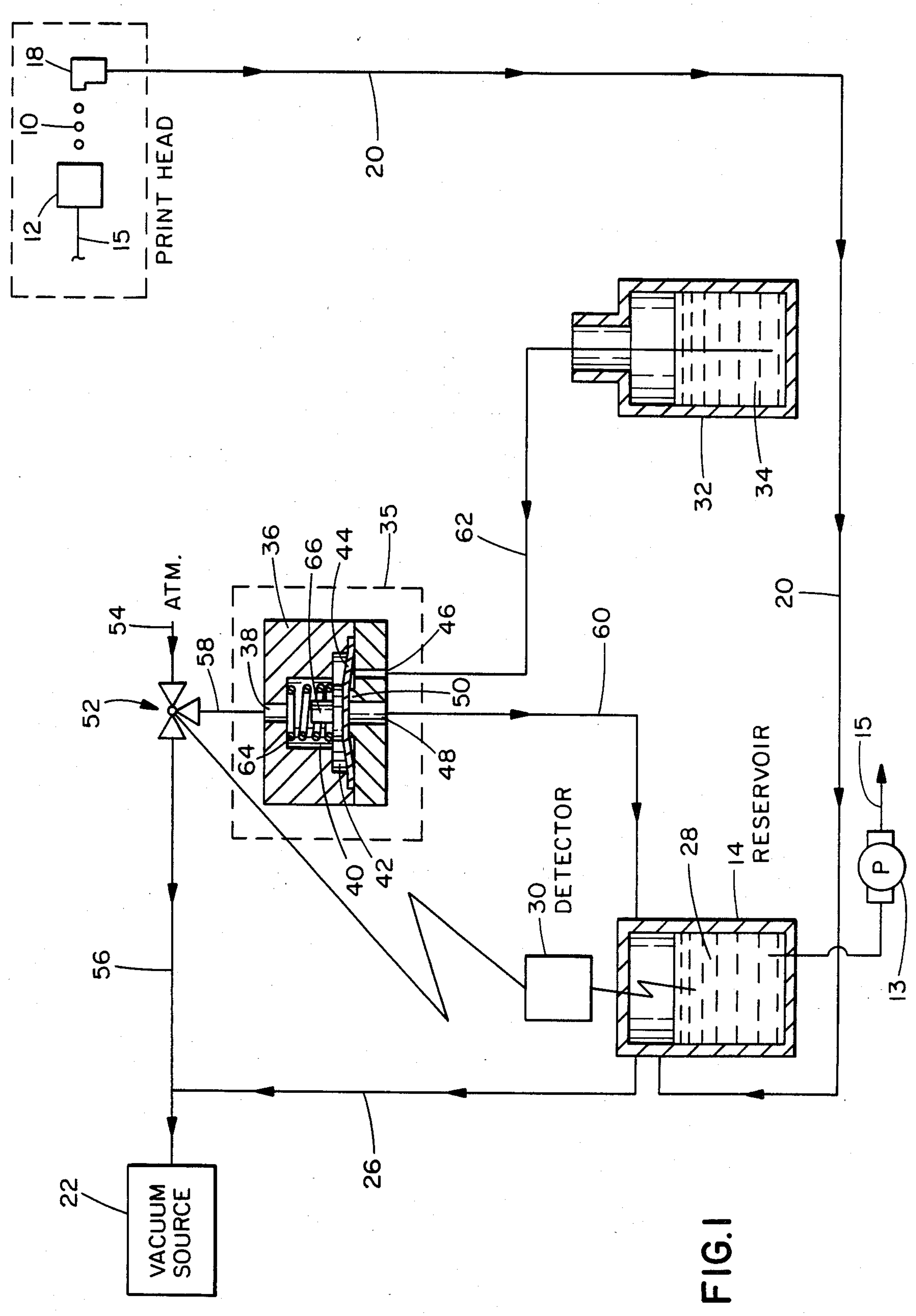
FIG. 1 is a system diagram illustrating the operation of the valve in a liquid marking system.

Referring to FIG. 1, there is disclosed a simplified version of a liquid marking system suitable for understanding the valve system of the present invention. In such exemplary system ink drops 10 are formed by an ink jet nozzle 12 supplied from a suitable source of pressurized ink, such as reservoir 14 via pump 13 and conduit 15. Ink which is not used for marking, e.g., not deflected onto the surface to be marked by electrostatic or other means, is intercepted by an ink catcher 18 and returned to the reservoir 14 for reuse via a return conduit 20.

Associated with the ink catcher 18 is a vacuum source 22 which assists in the return of ink from the ink catcher to the ink supply reservoir by maintaining reduced pressure in the line 20 and the reservoir 14 via conduit 26. This vacuum source is commonly referred to as the system vacuum.

During operation, a suitable amount of ink 28 resides in reservoir 14. Periodically there must be addition of ink and/or restoration of lost solvent. The need for additional liquid is determined by a detector 30 which, as discussed in the background portion of the specification, may operate on volume, specific gravity of the ink, by weight or by counting printed drops. When the detector 30 determines that additional liquid (solvent or fresh ink) is required it is obtained from a liquid reservoir 32 having a supply of liquid 34 therein. According to the invention this is accomplished by operation of the three port valve 35 of the present invention.

The valve 35 has three ports for control and communication of liquid. A control port 38 communicates, via a spring chamber 40 with a valve chamber 42 contained within a housing 36. Disposed within the valve chamber 42 is a flexible diaphragm 44 secured at its periphery to the housing. The mid portion of the diaphragm is free to flex up and down in the chamber as a function of the differential pressure or force applied thereto.

Disposed in the lower portion of the housing on the opposite side of the diaphragm from the control port 38 are the supply and output ports 46 and 48, respectively. As shown in FIG. 1, the output port is centrally disposed and may be sealed off by the diaphragm 44 to prevent solvent flow through the valve. Sealing is accomplished by the diaphragm engaging a valve seat or sealing surface 50 formed by the bottom wall of the valve chamber and surrounding the output port. It is preferred, but not necessary, that the valve sealing surface 50 be raised somewhat above the remaining portion of the bottom of the valve chamber. This reduces the possibility of leakage in the sealing position.

The supply port 46 enters the valve chamber at a point intermediate the output port and outer wall of the valve chamber on the same side of the diaphragm as the output port.

As will be noted, the cross sectional area of the output port 48 is small as compared to the area of the valve chamber 42 and thus in the case where equal vacuum (negative pressure) is applied to both sides of the diaphragm 44 the pressure above the diaphragm will act over a greater surface area to activate the valve. As will be described, it is in this manner that the diaphragm is unseated to permit fluid flow.

Associated with the valve of the present invention is a 3-way control valve 52 communicating with: the atmosphere or other comparable environmental pressure via conduit 54; the system vacuum via conduit 56; and the control port 38 via conduit 58. The 3-way valve is an electrically operated valve of a commercially available type as, for example, Clippard Model No. EVO-3. It can be moved between two positions interconnecting different ones of the conduits communicating therewith. Its operation is controlled by some sensing means, for example, the detector 30, to control flow of liquid from the reservoir 32 to the ink reservoir 14.

The operation of the valve system according to the invention will now be described with reference to FIG. 1. The valve is shown in its closed position, a position which is maintained until the ink supply 14 requires additional liquid. The valve is closed due to the fact that the output port 48 is connected to the system vacuum via: conduit 60; the evacuated ink supply reservoir 14; and conduit 26. Thus, the vacuum from the source 22 exerts negative pressure on the lower surface of the diaphragm 44 drawing it down against the valve seat 50. This action prevents fluid flow through the valve. The force which holds the diaphragm against the valve seat 50 is due to the pressure differential across the diaphragm since, in the closed position of valve 35, the 3-way valve 52 communicates conduit 54 to conduit 58 whereby atmospheric pressure is supplied to the control port 38 and thus to the upper portion of the valve chamber 42.

When additional liquid is required, as determined by detector 30, a signal is supplied to the 3-way valve 52 causing it to assume a second position. In this position it communicates the control port 38 to the system vacuum 22 via conduit 56. The pressure on the diaphragm 44 (negative pressure or vacuum) is now the same on both sides of the diaphragm 44. However, because the area on the upper surface of the diaphragm exposed to the vacuum is greater than the area on the lower surface of the diaphragm, a force is generated which flexes the diaphragm away from the valve seat 50. Fluid can then be transported from one location to another, herein exemplarily shown as the liquid reservoir 32, via conduit 62, supply port 46 and the lower portion of valve chamber 42 to the output port 48 and via conduit 60 to the ink supply reservoir 14.

As shown in FIG. 1, the liquid reservoir 32 must be vented so that as liquid is withdrawn, air can enter the reservoir to prevent the creation of a vacuum therein which would interfere with liquid flow to the reservoir 14.

As long as system vacuum is applied to the control port 38 the valve is held open permitting liquid to pass through the valve and into the ink supply reservoir 14. This transfer of liquid is accomplished by the vacuum source 22 acting through the ink reservoir 14 and conduits 26, 60 and 62, as previously indicated.

When the supply of liquid has been replenished, detector 30 again signals the 3-way valve 52 which resumes its first position wherein the control port 38 is vented to atmospheric pressure permitting the vacuum on the output port to flex the diaphragm downwardly to seal it against the seat 50. This terminates flow of the liquid.

The valve according to the invention may optionally include a coil spring 64 contained within the spring chamber 40. The upper end of the spring is compressed against the housing while the lower end of the spring, via a button 66 which is received therein, engages the upper surface of the diaphragm 44. Contrary to appearance, spring 64 is not provided for sealing the valve when the system is operational. Rather the spring is provided solely to prevent siphon action when the system is totally de-energized. Accordingly, the spring, if utilized, should be a relatively weak one having a force only sufficient to prevent siphoning action when the vacuum source 22 is not operational. Its force should be only a small fraction of the "cracking force" necessary to unseat the diaphragm 44.

Because of the relatively simple construction of the present valve system, due to the unique use of the system vacuum for both valve operation and liquid transport, the invention can be manufactured at low cost and of a small enough size to be incorporated directly into a closure mechanism for the liquid reservoir 32. Such a preferred embodiment of the invention is illustrated in FIG. 2.

As previously indicated, the liquid reservoir 32 must be vented to the atmosphere to prevent the formation of a vacuum in the reservoir which would interfere with liquid flow therefrom. For illustrative purposes this is indicated by a one way valve schematically indicated at 70. Of course, any other venting system is suitable for present purposes.

Figure 2:
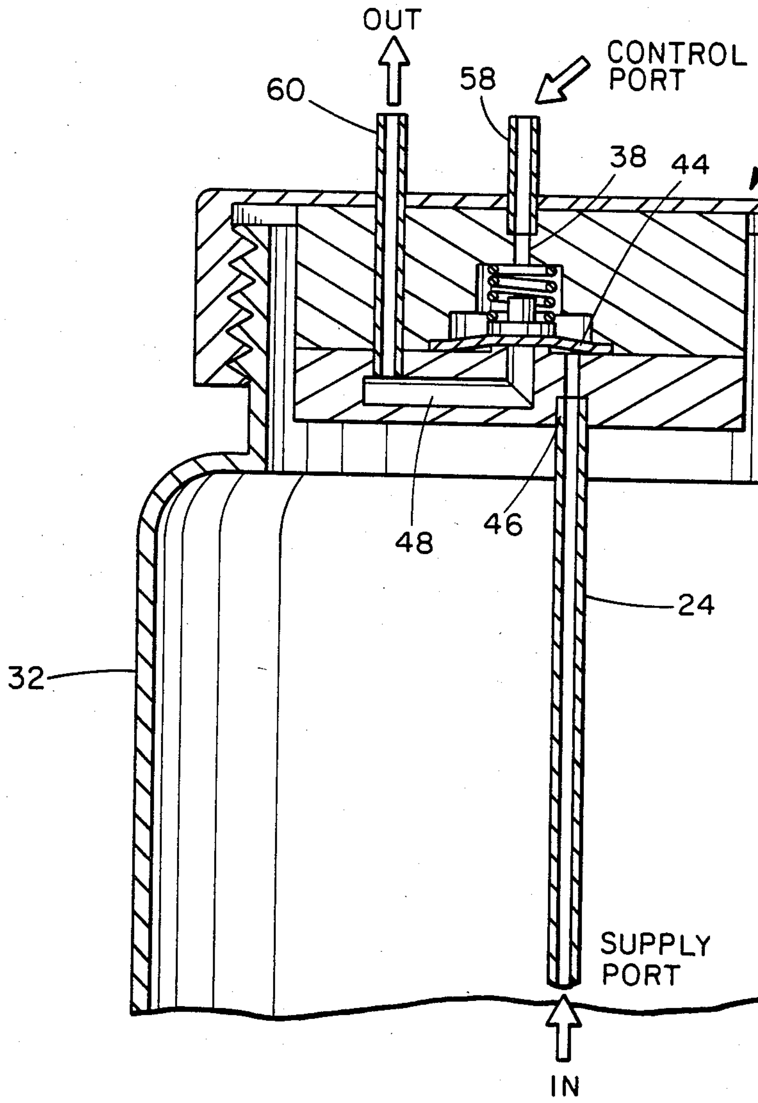
FIG. 2 illustrates a preferred embodiment of the invention in which the valve is incorporated into a closure member of a solvent container.

As shown in FIG. 2, the valve according to the present invention is fitted into a closure element 72 which, in the illustrated embodiment, is threadingly engaged to the upper portion of the reservoir 32. The supply port 46 is connected to a conduit 24 which extends downwardly to a point near the bottom of the reservoir 32. The control port 38 is connected to the conduit 58 which communicates it to the 3-way valve 52 which may be located remotely from the liquid reservoir.

In this embodiment the output port 48 has a slightly different configuration from that shown in FIG. 1 permitting communication with the conduit 60 and the ink supply reservoir 14 via the top of the closure element 72. Thus, the output port 48 includes a right angle bend and the conduit 60 passes into the closure member 72 to a point of communication with the output port. This is so, as will be readily understood, because the input and output ports must be located on the side of the diaphragm 44 opposite the control port 38.

Thus, due to the low cost of the valve, its small size and external control, it can readily be incorporated into the closure element 72 as illustrated. It may be discarded at intervals and replaced with a new valve and closure combination whereby servicing of the valve is unnecessary. Indeed, if desired, a valve-closure assembly can be included with each replacement liquid container and the entire liquid reservoir replaced when empty.

This not only insures reliability through periodic replacement but also allows for security. The cap and valve assembly can be manufactured so that they cannot be removed thereby preventing refilling of the liquid reservoir with improper liquids which, in turn, could adversely affect the operation of the marking system.

While we have shown and described embodiments of this invention in some detail, it will be understood that this description and illustrations are offered merely by way of example, and that the invention is to be limited in scope only by the appended claims.

What is claimed is:

1. A vacuum operated valve comprising:

(a) a housing containing a valve chamber, (b) a diaphragm disposed across one wall of said chamber and capable of flexing toward and away from sealing engagment with portions of said one wall, (c) a control port communicating with said chamber to permit control of the pressure in a first portion of said chamber on the side of the diaphragm opposite said one wall, (d) a supply port for communicating a liquid supply to said chamber through said one wall, (e) an output port, smaller in size than the valve chamber, for conducting liquid from the chamber through said one wall and for permitting control of the pressure in a second wall of the chamber between the diaphragm and said one wall, (f) means for continuously maintaining the second portion of the chamber below environmental pressure via said output port, and (g) means for selectively maintaining, independently of said output port, the first portion of said chamber at either approximately environmental pressure or below environmental pressure via said control port, whereby when the first portion of said chamber is at environmental pressure the pressure differental across the diaphragm causes it to sealingly engage said one wall preventing flow through said output port; and when said first chamber portion is below environmental pressure, the diaphragm is caused to flex away from said one wall and permit liquid flow through the output port but without communication to the control port thereby to insure no liquid contamination thereof.

2. The valve according to claim 1 wherein said means for selectively maintaining includes:

(a) a vacuum source (b) a 3-way valve operable between two positions, one position communicating said vacuum source to said control port, the other position communicating environmental pressure to said control port.

3. The valve according to claim 2 wherein said means for selectively communicating further including detector means for operating said 3-way valve as a function of a detected external condition indicating the need for liquid from the liquid supply.

4. The valve according to claim 1 further including bias means for maintaining the diaphragm in the sealing position when the means for continuously maintaining is inoperative thereby to maintain sealing engagement of the diaphragm with said one wall.

5. The valve according to claim 1 wherein said output port is centrally located on said one wall.

6. The valve according to claim 1 wherein said one wall includes a raised portion surrounding said output port for engaging said diaphragm to prevent flow through said output port.

7. In combination:

(a) a liquid container having a closure member secured to an upper portion of said container, (b) a vacuum operated valve contained solely within said closure member comprising:

(i) a housing containing a valve chamber, (ii) a diaphragm disposed across one wall of said chamber and capable of flexing toward and away from sealing engagement with portions of said one wall, (iii) a control port communicating with said chamber to permit control of the pressure in a first portion of said chamber on the side of the diaphragm opposite said one wall, (iv) a supply port for communicating the liquid in said container to said chamber through said one wall, (v) an output port, smaller in size than the valve chamber, for conducting liquid from the chamber through said one wall and for permitting control of the pressure in a second portion of the chamber between the diaphragm and said one wall, (c) means for continuously maintaining the second portion of the chamber below environmental pressure via said outport port, and (d) means for selectively maintaining, independently of said output port, the first portion of said chamber either at environmental pressure or below environemtal pressure via said control port without communication to the output port thereby to insure no liquid contamination of the control port.

8. The combination according to claim 7 wherein said means for selectively maintaining includes:

(a) a vacuum source (b) a 3-way vlave operable between two positions, one position communicating said vacuum source to said control port, the other position communicating environmental pressure to said control port.

9. The combination according to claim 8 wherein said means for selectively communication further includes detector means for operating said 3-way valve as a function of a detected external condition indicating the need for liquid from said liquid container.

10. The combination according to claim 7 wherein said one wall includes a raised portion surrounding said output port for engaging said diaphragm to prevent flow through said output port.

11. A valve for controlling liquid flow in a liquid marking system having a vacuum source associated therewith comprising:

(a) a housing containing a valve chamber, (b) a diaphragm disposed across one wall of said chamber and capable of flexing toward and away from sealing engagement with portions of said one wall, (c) means for selectively communicating either the vacuum source or environmental pressure to a first portion of said chamber on the side of the diaphragm opposite said one wall, (d) a supply port for communicating a liquid supply to said chamber through said one wall, (e) means, including an output port not in communication with said first portion of said chamber, for continuously communicating the vacuum source with a second portion of the chamber defined by the space between the diaphragm and said one wall, whereby when the first chamber portion is at environmental pressure, the pressure differential across the diaphragm causes it to sealingly engage said one wall preventing flow through said output port; and when said first chamber portion is below environmental pressure the diaphragm is caused to flex away from said one wall and permit liquid flow through the output port but without communication to the first chamber portion thereby to insure no liquid contaimination thereof.

12. The valve according to claim 11 wherein the means for selectively communicating includes a 3-way valve operable between two positions, one position communicating said vacuum source to said first portion of the chamber, the other position communicating environmental pressure to said first portion of the chamber.

13. The valve according to claim 12 wherein said means for selectively communicating further includes detector means for operating said 3-way valve as a function of a detected external condition indicating the need for fluid from the fluid supply.

14. The valve according to claim 11 further including bias means for maintaining the diaphragm in the sealing position when the vacuum source is inoperative to maintain sealing engagement of the diaphragm with said one wall.

15. The valve according to claim 11 wherein said one wall includes a raised portion surrounding said output port for engaging said diaphragm to prevent flow through said output port.

* * * * *